United States Patent [19]

Tomoda et al.

[11] Patent Number: 4,991,159

[45] Date of Patent: Feb. 5, 1991

[54] TIME DISPLAY DEVICE FOR AN APPARATUS FOR PLAYING INFORMATION RECORDED ON AN OPTICAL DISK

[75] Inventors: Haruhisa Tomoda, Neyagawa; Yasuomi Shimada, Katano, both of Japan

[73] Assignee: Matsushita Electric Industrial Co., Ltd., Kadoma, Japan

[21] Appl. No.: 128,911

[22] Filed: Dec. 4, 1987

[30] Foreign Application Priority Data

Jan. 13, 1987 [JP] Japan .................................. 62-5371
Jan. 13, 1987 [JP] Japan .................................. 62-5372

[51] Int. Cl.$^5$ ............................................. G11B 31/00
[52] U.S. Cl. ........................................ 369/19; 369/32; 340/309.4; 368/10
[58] Field of Search ...................... 369/19, 32, 43, 54, 369/59; 340/309.15, 309.2, 309.3, 309.4, 309.5; 368/82-84, 108, 274, 10

[56] References Cited

U.S. PATENT DOCUMENTS 4,307,418  12/1981  Mindel et al. ..................... 369/32 X
4,376,956   3/1983  Kelleher ............................ 369/43 X
4,541,022   9/1985  Katsuyama ....................... 369/59 X
4,682,317   7/1987  Tomisawa ......................... 369/59

FOREIGN PATENT DOCUMENTS 61-85671  5/1986  Japan ..................................... 369/19

OTHER PUBLICATIONS

"NEC's CD-705E: Fully Loaded and Less Expensive"; Hart, Digital Audio, Feb. 1985, pp. 44 & 47.

Primary Examiner—Aristotelis M. Psitos
Attorney, Agent, or Firm—Wenderoth, Lind & Ponack

[57] ABSTRACT

A time display device for an apparatus for playing information recorded on an optical disk includes a first input device for specifying a total playing time and a second input device for specifying portions of the disk to be played. A time adding unit obtains a sum of the playing times of the portions of the disk specified by the second input device. A subtracting unit obtains a subtracted value by subtracting the sum obtained by the time adding unit from the total playing time. The total playing time is then displayed in a numerical fashion, whereas the sum obtained by the adding unit is displayed in a bar graph fashion.

1 Claim, 9 Drawing Sheets

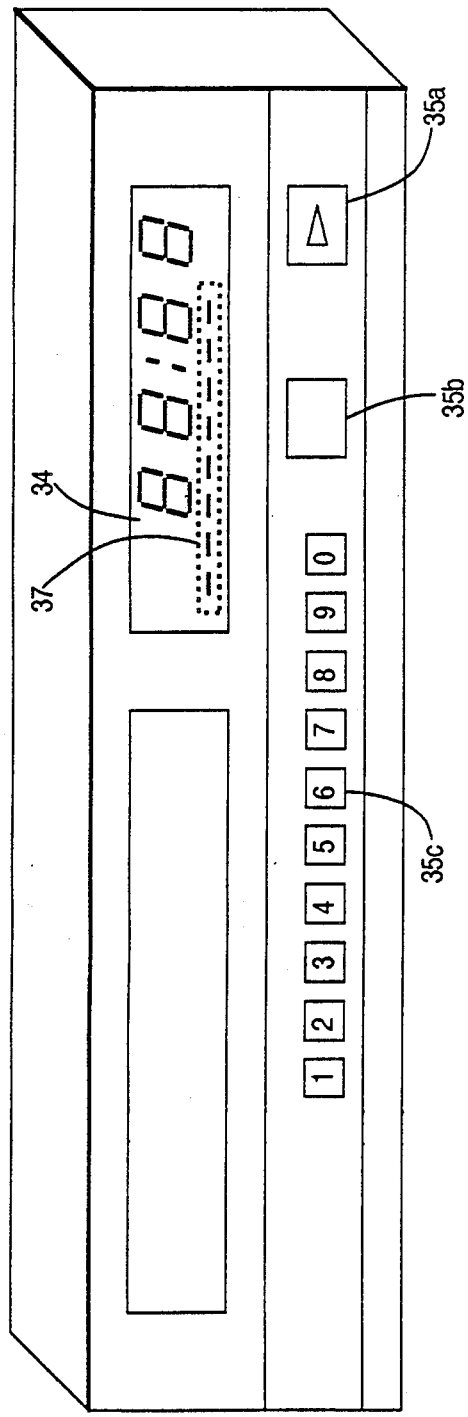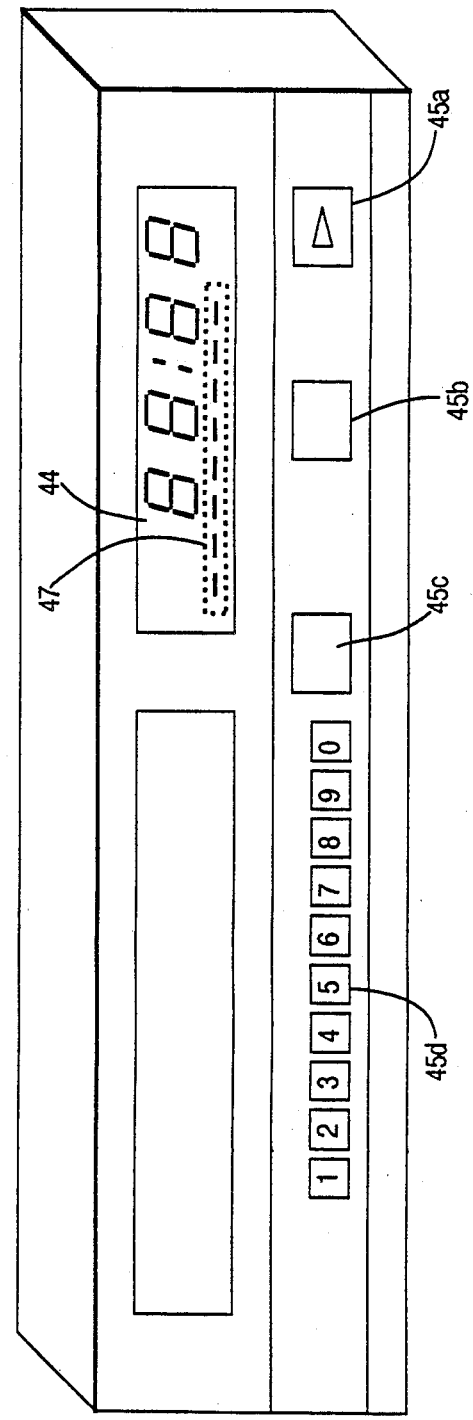

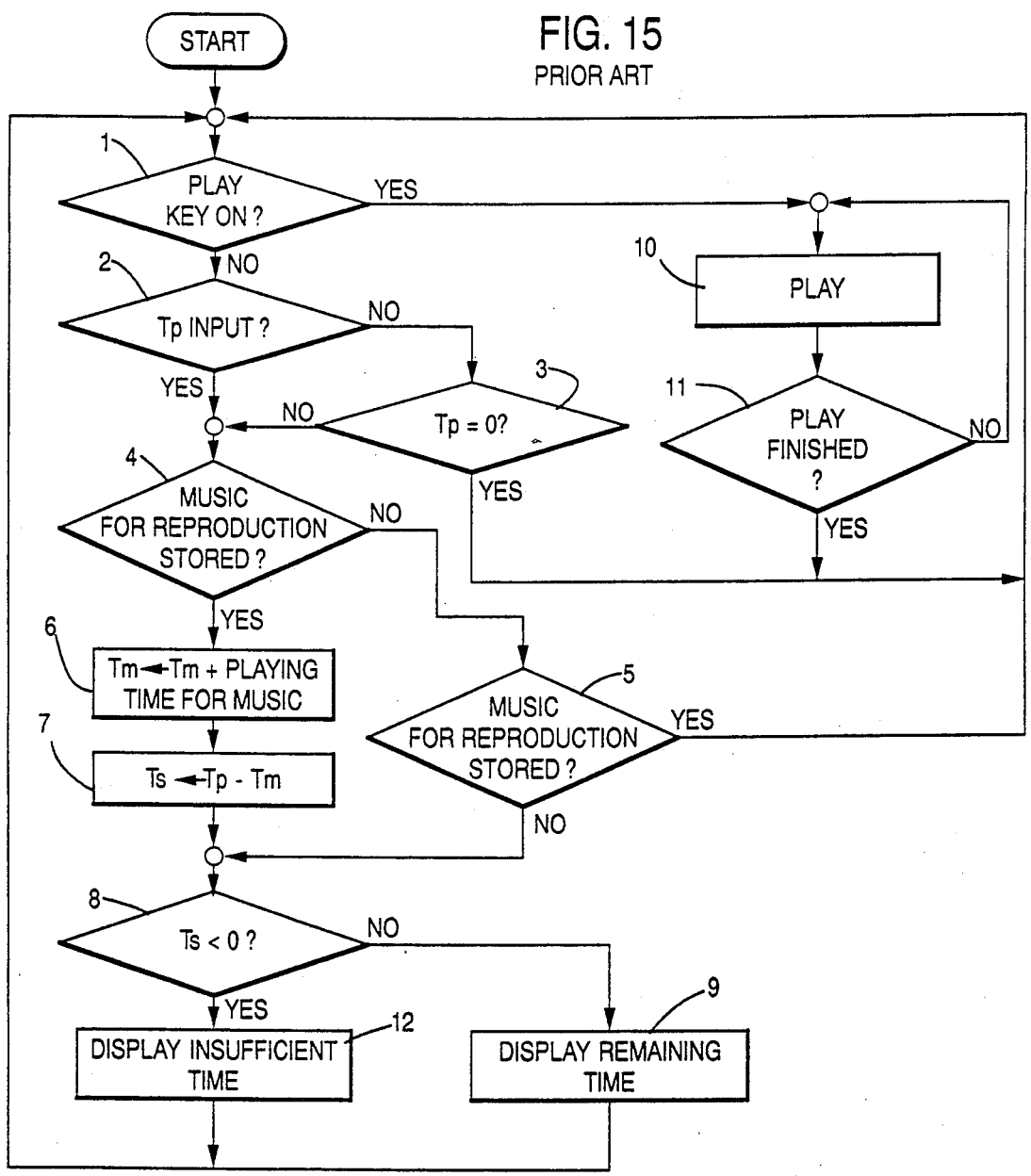

TIME DISPLAY DEVICE FOR AN APPARATUS FOR PLAYING INFORMATION RECORDED ON AN OPTICAL DISK

BACKGROUND OF THE INVENTION

Optical disk reproducing apparatuses such as compact disk players have come into wide use in recent years.

Generally, recorded on the optical disk are the recorded information, such as music, and the index information, such as the playing time in connection with the recorded information.

In an optical disk reproducing apparatus, it has been a practice to utilize the index information, such as the playing time, to edit information such as music on a magnetic tape by combining an arbitrary program reproduction and a tape recorder.

Conventionally, an optical disk player of this type has a constitution as shown in FIG. 9 through FIG. 11.

That is, FIGS. 9 and 10, number 1 denotes a signal detecting unit comprising a light pickup device or the like which reads out music information or playing time information recorded on an optical disk (hereafter simply called a disk), numeral 2 denotes a signal output unit which processes information read by the signal detecting unit, converts it into an audio signal and output the thus obtained audio signal, number 3 denotes a control unit which controls the signal detecting unit 1 and the signal output unit 2, numeral 4 denotes a display unit which displays by means of the control unit 3 the playing time read by the signal detecting unit 1 and information inputted from a key switch unit, and numeral 5 denotes a key switch unit comprising a play key 5a which commands the control unit 3 to start playing and a continuous playing time specifying key 5b which specifies a time to continue a play to the control unit 3.

An arbitrary time can be specified to the control unit 3 by using the number keys (0 to 9) 5c and the foregoing continuous playing time specifying key 5b.

Further, a control as shown in the flowchart of FIG. 11 is accomplished in accordance with the above constitution.

In other words, whether the play key 5a has been depressed is determined in step 1, and if it has been depressed, then the control proceeds to step 4, and if it has not been depressed, then the control proceeds to step 2. In step 2, whether the continuous playing time has been specified is determined, and if it has not been specified, the control returns to step 1. In step 3, the specified continuous playing time is displayed in numerical characters on the display unit 4 by means of the control unit 3. In step 4, music information or the like recorded on a disk is played by the signal detecting unit 1 and the signal output unit 2. In step 5, the signal detecting unit 1 reads out the playing time information from the disk, compares the read playing information with the continuous playing time specified in step 2 to determine whether play has ended, and if it has ended, returns to step 1, and if it has not ended, steps 4 and 5 are repeated. In case the continuous playing time is not specified, the signal detecting unit 1 determines that the play is ended according to the ended play information of the disk.

However, because the display is only given by numeric characters when a continuous playing time is specified according to the conventional constitution described above, reading errors often caused errors in specifying the continuous playing time when a quick operation was made.

Conventionally, one of the optical disk players of the above type employed a constitution as shown in FIG. 12 through FIG. 15.

As shown in FIGS. 12 and 14, numeral 1 denotes a signal detecting unit comprising a light pickup device which reads out music information and play time information recorded on an optical disk (hereafter simply called a disk), numeral 2 denotes a signal output unit which processes the information read by the signal detecting unit, converts it into audio signal and outputs the audio signal, 13 denotes a control unit which controls these signal detecting unit 1 and the signal output unit 2 and contains in a part thereof a control unit for added and subtracted time display 16. 14 denotes a display unit which displays by means of the control unit 13 the playing time read by the signal detecting unit 1 and information input from the key switch unit 15 which comprises a play key 15a which commands the control unit 13 to start playing, reproduction time input key 15b which specifies the control unit 13 with a time to cause to continue the play, a music input key 15c which causes the storage of music to be played, and the number key 15d.

The continuous playing time is specified to the control unit 13 by using the number key 15d and the reproduction time input key 15b. Any music to be played is specified to the control unit 13 by using the number key 15d and the music input key 15c.

As shown in FIG. 13, the control unit 16 for added and subtracted time display comprises a specified reproduction time storage unit 18 which stores the reproduction time specified by the reproduction time input means 17, a reproduced music storage unit 20 which stores the music specified by a stored music input means 19, a stored music reproduction time adding unit 21 which obtains the sum of the stored music and the reproduction time, a subtracting means 22 which subtracts the sum of the stored music reproduction time from the specified reproduction time, and a time display means 23 which displays in numeric characters the data obtained by the subtracting means 22.

A control as shown in the flowchart of FIG. 15 is effected by the constitution described above.

That is to say, step 1 determines whether the play key 15a is depressed, and if depressed, the control proceeds to step 10, and if not pressed, the control proceeds to step 2. In step 2, the presence of the input of reproduction time Tp is determined, and if no input is present, the control shifts to the step 3, and if input is present, the control shifts to the step 4. The initial value of the reproduction time Tp during this shift is 0. In step 3, in order to determine whether the step has gone to the step 4 even once, whether Tp is equal to 0 is determined, and if equal to 0, the control returns to step 1, and if not equal to 0 the control shifts to step 4. In step 4, the presence of an input to store the played music is determined, and if no input exists, the control shifts to the step 5, and if an input exists, the control shifts to step 6. In step 5, the presence of the music stored for reproduction is determined, and if it is present, control shifts to the step 8, and if it is not present, the control returns to step 1. In step 6, in order to obtain the sum Tm of the stored music reproduction time, the reproduction time is added to Tm in the stored music reproduction time adding unit each time the stored music is inputted therein, and the control shifts to step 7. In step 7, the sum Tm of the stored music reproduction time is subtracted from the specified reproduction time by the subtracting means 12. In step 8, whether the remaining time Ts is smaller than 0 is determined, and if not smaller than 0, the control shifts to step 9, and if smaller than 0, the control returns to step 12. In step 9, the remaining time is displayed in the display unit by the time display means 13 and the control returns to step 1. In step 12, negative numbers are displayed in the display unit by the number displaying means 13 to indicate the insufficient time and to inform that it is impossible to completely reproduce all of the stored musics within a specified reproduction time, and the control returns to step 1. In step 10, the music information or the like which is recorded on a disk by the signal detecting unit 1 and the signal output unit 2 is played. In step 11, the signal detecting unit 1 reads out the playing time information from the disk, compares the playing time with the specified reproduction time specified in the step 2 to determine whether the play has ended, and if the play has ended, control returns to the step 1, and if the play has not ended, then steps 10 and 11 are repeated. In case the continuous playing time is not specified, the play is determined to have ended according to the ended play information of the disk.

However, in such a conventional constitution as above, a first problem encountered is that only the remaining time is displayed and the operator cannot recognize unless the operator calculates the total reproduction time required using the head. A second problem encountered is that an error in recognition is likely to occur even if the stored music reproduction time exceeded the specified reproduction time because the display is given only in negative numbers.

BRIEF SUMMARY OF THE INVENTION

A primary object of the present invention is to eliminate such conventional problems as described above and to provide an optical disk reproducing apparatus which is capable of displaying the specified continuous playing time on a time scale so that the operator can recognize such specified continuous playing time in an instant.

For the purpose of achieving the above object, the optical disk reproducing apparatus according to the present invention comprises a key switch unit for specifying the continuous playing time, a continuous playing time—time scale converting unit for converting the data of the specified continuous playing time into the data for time scale display, and a time scale for the continuous playing time display for displaying the data for time scale display.

The effects of the present invention according to the foregoing means include the following. Namely, by displaying the specified continuous playing time on the time scale, numeric values are converted into a sense in terms of length so that it becomes possible for the operator to recognize the specified continuous playing time in an instant. Therefore, the probability of errors in specifying the time will be reduced.

A second object of the present invention is to provide an optical disk reproducting apparatus which can easily recognize by the time scale display the sum total of the stored music reproduction time selected by the operator.

Further, a third object of the present invention is to provide an optical disk reproducing apparatus which can easily recognize the excess or shortage of the specified continuous playing time with respect to the sum total of the stored music reproduction time selected by the operator.

For the purpose of achieving the above object, the optical disk reproducing apparatus according to the present invention comprises a reproduction time input means which specifies the time to continue the play, a specified reproduction time storage unit which stores the specified reproduction time, a stored music input means which causes the storage of the music to be played, a reproduced music storage unit which stores the music specified by the stored music input means, a stored music reproduction time adding unit which obtains the sum of the reproduction time of the stored music, a subtracting means which subtracts the sum of the stored music reproduction time from the specified reproduction time, a time scale display means which displays the sum total of the stored music reproduction time obtained by the foregoing stored music reproduction time adding unit and the data obtained by the foregoing subtracting means, and a display means which displays in numerical values the data obtained by the foregoing subtracting means.

The effects of the foregoing means according to the present invention include the following. That is to say, it is possible to display the added time by obtaining the sum of the reproduction time of the stored music, and by converting it into the data for time scale display. Furthermore, it is possible to cause the operator to clearly recognize the shortage of time by subtracting the sum of the stored music reproduction time from the specified reproduction time and by turning on and off the numeric characters displayed on the time display unit if the difference of the subtraction is negative as well as the time scale equivalent to such difference.

DETAILED DESCRIPTION

For the purpose of achieving the first object of the present invention, embodiments thereof will hereafter be described with reference to the drawings. In FIG. 1 and FIG. 2, 31 and 32 denote the signal detecting unit and the signal output unit having the same functions as those of a conventional embodiment, and 33 denotes the control unit to control the signal detecting unit 31 and the signal output unit 32. 34 denotes the display unit to display the playing time and the continuous playing time and so forth. 35 denotes the key switch unit comprising the play key 35a which issues a play start command to the control unit 33, the continuous playing time specifying key 35b which specifies the control unit 33 with the time to continue the play, and the number key 35c. 36, which is a part of the control unit 33, denotes the continuous playing time—time scale converting unit (hereafter simply called the time scale converting unit) which converts the continuous playing time data specified by the key switch unit 35 into the data for time scale display. 37, which is a part of the display unit 34, denotes the time scale for the continuous playing time display which displays the data converted by the time scale converting unit 36.

In the continuous playing time—time scale converting unit 36, in order to display the continuous playing time on the time scale 37, the number of segments corresponding to the time necessary for displaying is decided by converting the number of segments which, for example, corresponds to one segment for displaying a five minute playing time.

Further, the time that one segment displays may be changed according to the length of the continuous playing time.

In other words, if the continuous playing time is 60 minutes, one segment is caused to correspond to a playing time of four minutes, but if the continuous playing time is 30 minutes, one segment may be caused to correspond to a playing time of eight minutes.

With respect to the embodiments of the present invention which are constituted as described above, operations thereof will be described using the flowchart shown in FIG. 3.

In FIG. 3, steps 1 through 5 are the same as those of the conventional embodiment, and therefore the description thereof are omitted. In step 6, the specified continuous playing time is converted into the data for time scale display by the time scale converting unit 36. In step 7, the data for time scale display converted in step 6 is displayed on the time scale 37 for continuous playing time display, and the control then returns to the step 1 after the data is displayed.

According to the embodiment as described above, the specified continuous playing time is converted into the data for time scale display by the time scale converting unit 36 so that it is possible to accomplish the time scale display according to the length of such time.

For the purpose of achieving the second and third objects of the present invention, embodiments thereof will be described with reference to FIGS. 4 through 8. In FIG. 4 and FIG. 6, 41 and 42 denote the signal detecting unit and the signal output unit having the same functions as those of the conventional embodiments, 43 denotes the control unit which controls the signal detecting unit 41 and the signal output unit 42 and contains in a part therein the added and subtracted time display control unit 46 which is described in detail in a later part of this specification. 44 denotes the display unit which displays the playing time or the like and contains in a part therein the time scale 47 for displaying the added time 47. 45 denotes the key switch unit comprising the play key 45a which gives the control unit 43 a command to start playing, the reproduction time input key 45b which specifies the control unit 43 with the time to continue playing, the stored music input key 45c which stores the music to be played, and the number key 45d and so forth.

Referring now to FIG. 5, the added and subtracted time display control unit 46 comprises the specified reproduction time storage unit 58 which stores the reproduction time specified by the reproduction time input means 57, the reproduced music storage unit 60 which stores the music specified by the stored music input means 59, the stored music reproduction time adding unit 61 which obtains the sum of the stored reproduction time to obtain the sum of the reproduction time of the stored music, the subtracting means 62 which is used to subtract the sum of the stored music reproduction time from the specified reproduction time, the time display means 63 which displays in numeric characters the data obtained by the subtracting means 62, and the time scale display means 65 which converts the data of the sum of the stored music reproduction time into the data for time scale display and displays the converted data on the time scale 47 for added time display.

When the data obtained by the subtracting means 62 becomes a negative number, the time scale display means 65 can turn on and off to display the length of the data of insufficient time obtained by the foregoing subtracting means 62 with respect to the length of the time scale of the sum of the stored music reproduction time displayed on the time scale 47 for added time display.

With respect to the embodiments of the present invention as constituted in the manner described above, operations thereof will be described by using the flowchart shown in FIG. 7.

In FIG. 7, steps 1 through 11 are the same as those of the conventional embodiment, and therefore a detailed description thereof is omitted. In step 14, the sum Tm of the stored music reproduction time obtained in step 6 is converted into the time scale data by the time scale display means 65 and displayed on the time scale for displaying the added time, and the control then shifts to step 7. In step 12, the time display means 63 displays the negative numbers on the display unit 44 to indicate the insufficient time and the display is caused to flash, and the control then shifts to step 13. In step 13, the time scale display means causes the time scale to turn on and off corresponding to the insufficient time Ts and the control then returns to step 1.

FIG. 8 shows an example of an actual display, wherein the specified reproduction time is 30 minutes and the number of music stored is seven and the sum of the reproduction time is 37 minutes 28 seconds, the time display unit 44 displays 7 minutes 28 seconds in negative numbers which is the insufficient time with respect to the specified reproduction time and the negative numbers are caused to turned on and off. On the time scale 47 for the added time display, the time scale equivalent to 30 minutes of 37 minutes 28 seconds which is the added time is turned on and further the time scale of 7 minutes 28 seconds exceeding 30 minutes is caused to turn on and off.

According to the embodiment of the present invention as described above, the remaining time and the reproduction time can be displayed at the same time, and if the stored reproduction time exceeds the specified reproduction time, it is possible to turn on and off the time display of the insufficient time and the time scale display.

In the above embodiments, the reproduction time is first specified and the music to be played is specified and stored, but it is also possible to first specify the music to be played and cause it to be stored and then to specify the reproduction time to accomplish a similar display.

As it is apparent from the above embodiments, the present invention comprises the continuous playing time specifying key which specifies the time to continue the play, the time scale for continued playing time display which displays said specified continuous playing time, the continuous playing time—time scale converting unit which converts the data of continuous playing time into the data for time scale display, so that the data of the specified continuous playing time is converted into the data for time scale display, thereby displaying the converted data on the display unit as the time scale to improve the visibility of display.

The present invention comprises: the reproduction time input means which specifies the time to continue the play, the specified reproduction time storage unit which stores the specified reproduction time, the stored music input means which stores the music to be played, the reproduced music storage unit which stores the specified music by the stored music input means, the stored music reproduction time adding unit whereby the sum of the reproduction time of the stored music is obtained, the subtracting means whereby the sum of the stored music reproduction time is subtracted from the specified reproduction time, and the display unit which displays the data obtained by the subtracting means. Wherein the display unit has the time display unit for displaying numeric characters and the time scale for displaying the added time, and wherein it is possible to display the remaining time of the specified reproduction time as well as the total reproduction time of the stored music by means of the time scale when the reproduction time is specified the storage of cause to the music to be played, and when the insufficient time is caused, it is possible to cause the operator to clearly recognize the shortage of time by turning on and off the time display of the insufficient time and the time scale corresponding to the insufficient time.

BRIEF DESCRIPTION OF THE DRAWINGS

FIG. 2 is the perspective diagram of the appearance of the same apparatus, FIG. 6 is the perspective diagram of the appearance of the same apparatus, FIG. 15 is the flowchart thereof.

Figure 1:
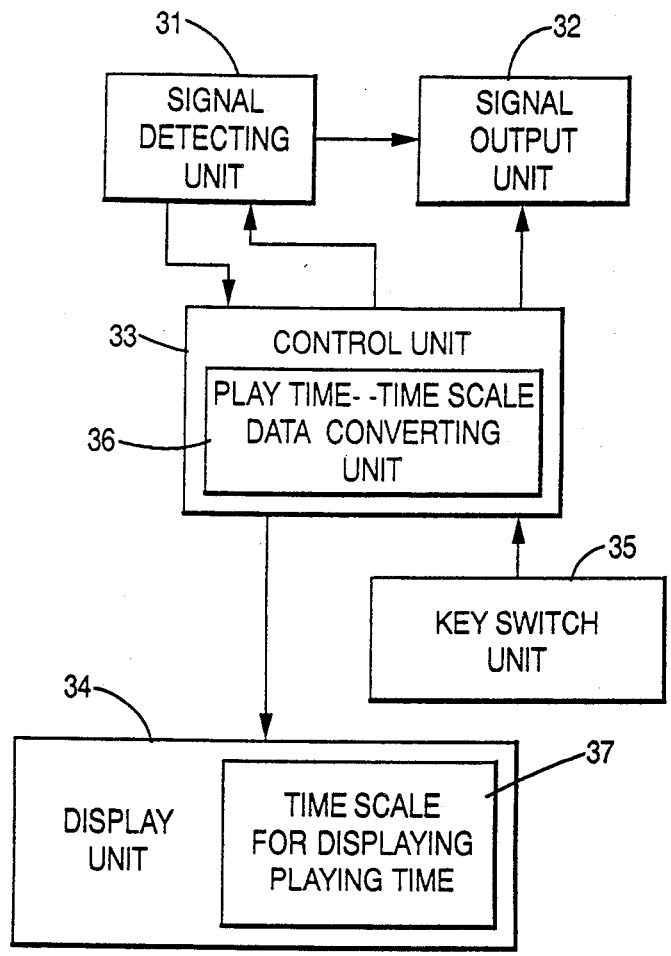
FIG. 1 is the block diagram showing an embodiment of the optical disk reproducing apparatus according to the present invention.
Figure 9:
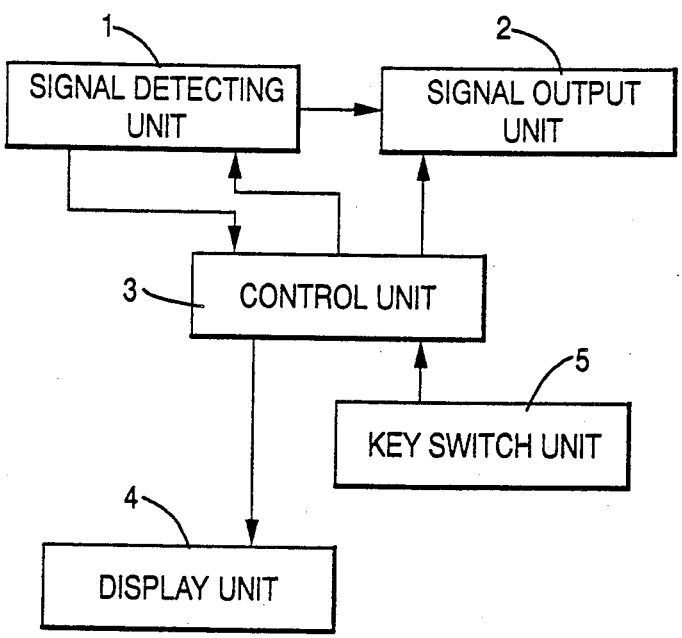
FIG. 9 is the block diagram of the conventional embodiment of the similar apparatus.
Figure 3:
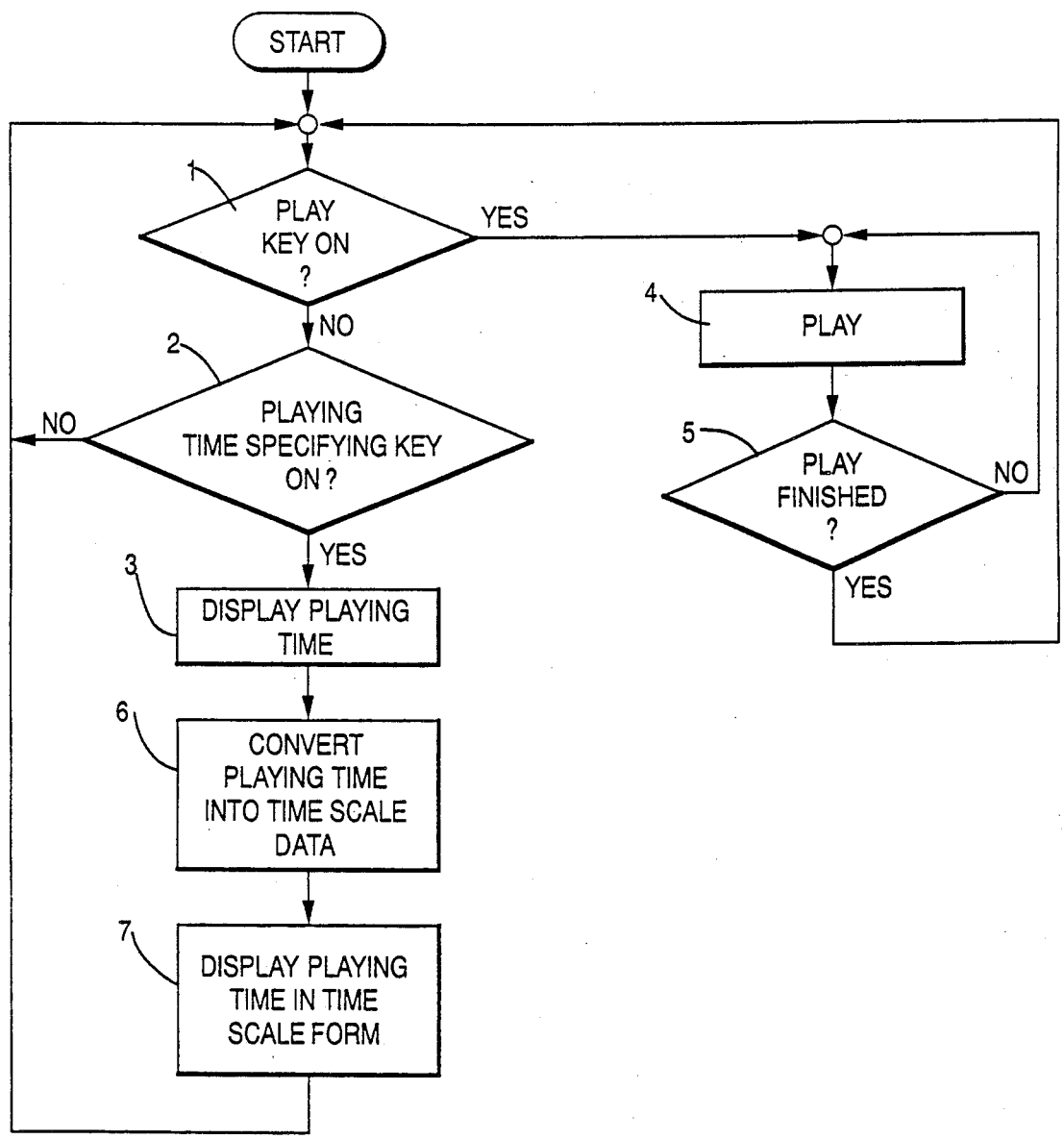
FIG. 3 is the flowchart for time scale display of the same apparatus.
Figure 4:
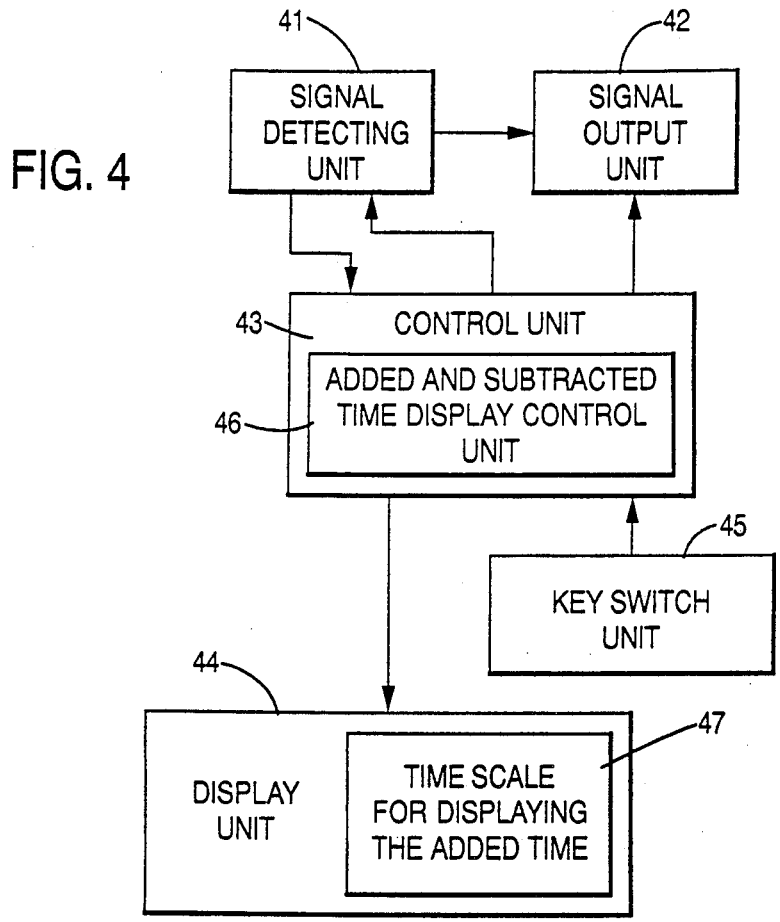
FIG. 4 is the block diagram showing another embodiment of the optical disk reproducing apparatus according to the present invention.
Figure 5:
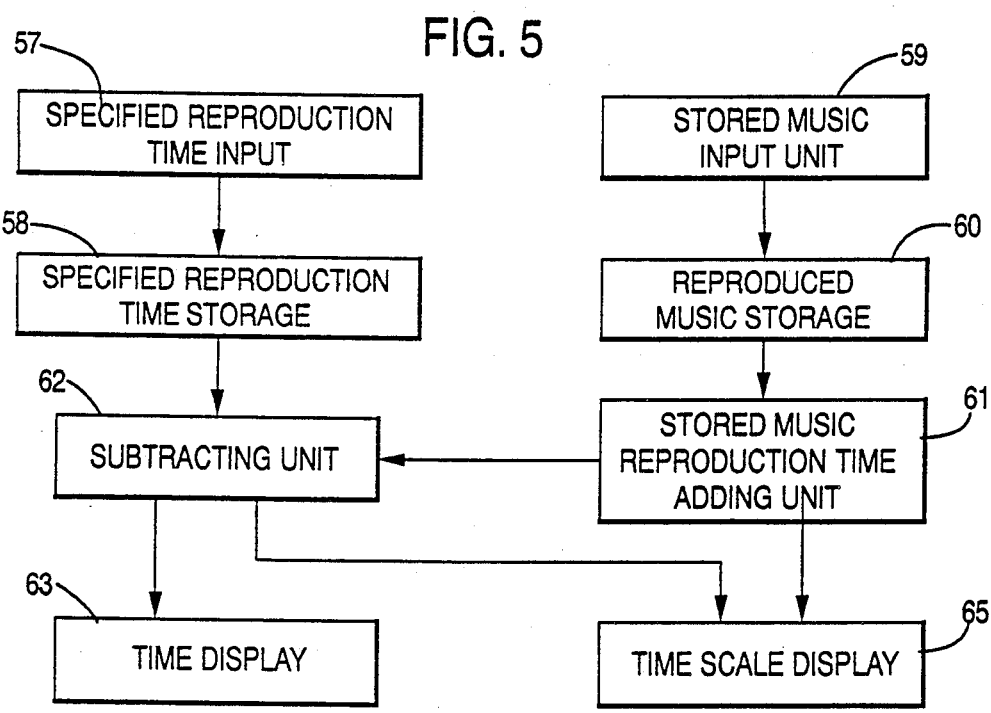
FIG. 5 is the block diagram showing essential parts of the apparatus.
Figure 7:
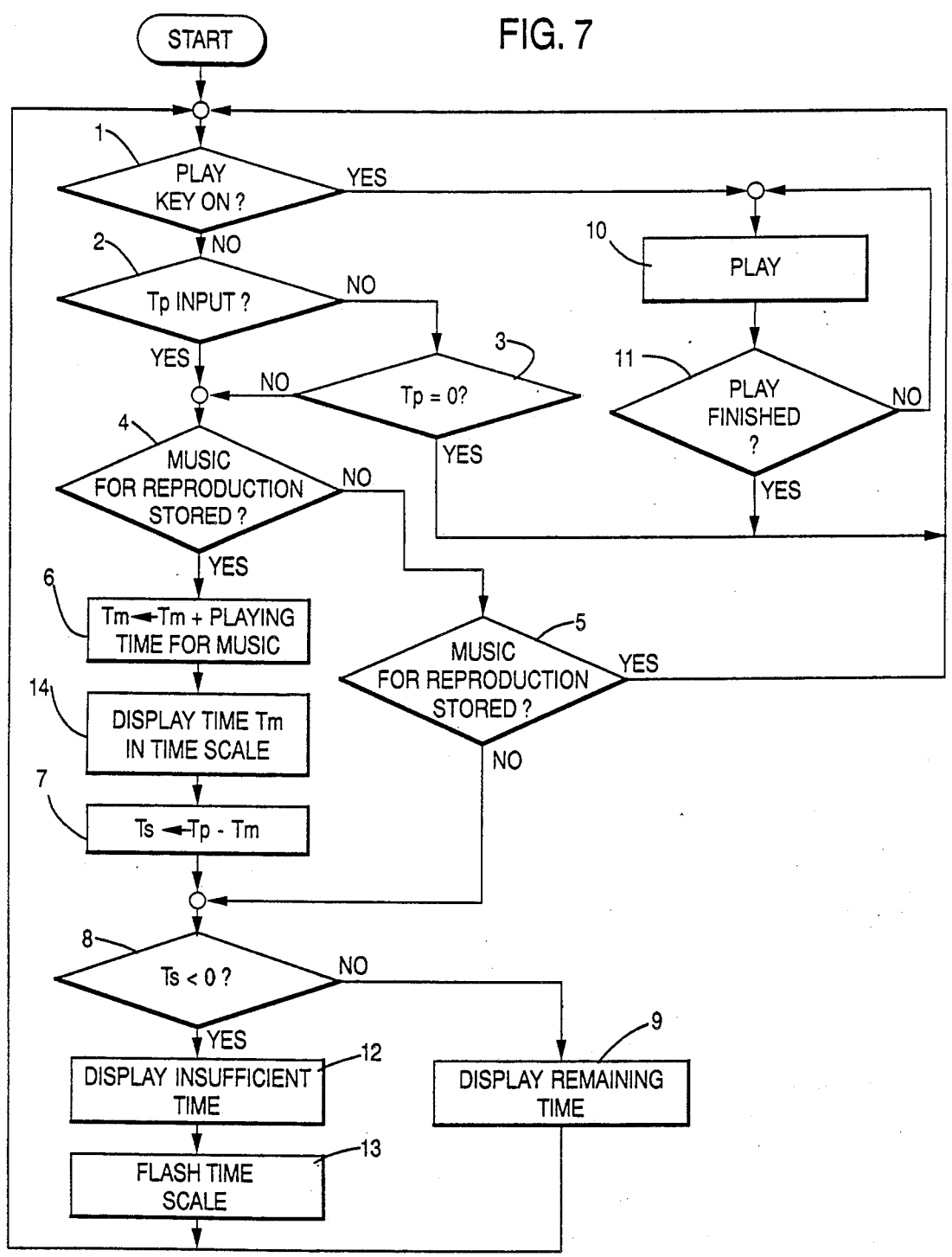
FIG. 7 is the flowchart for the playing time display of the same apparatus.
Figure 8:
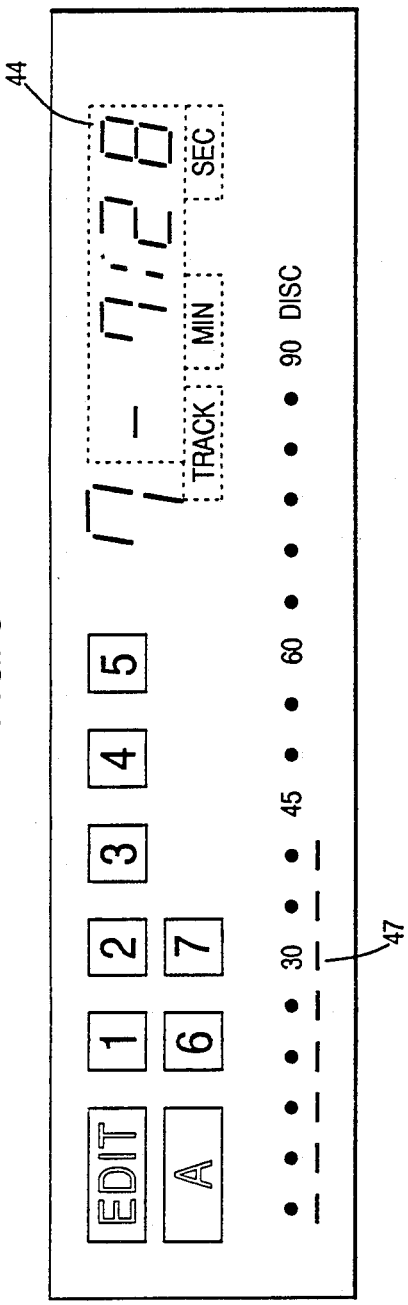
FIG. 8 is a front view example of an actual display.
Figure 10:
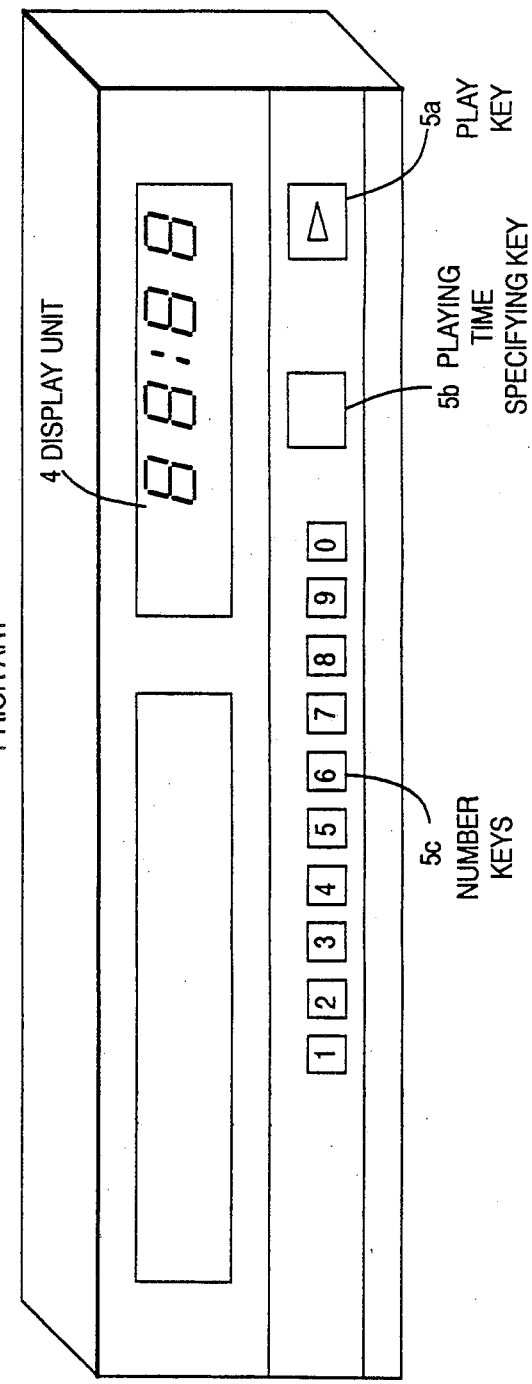
FIG. 10 is the perspective diagram of the appearance of the conventional apparatus.
Figure 11:
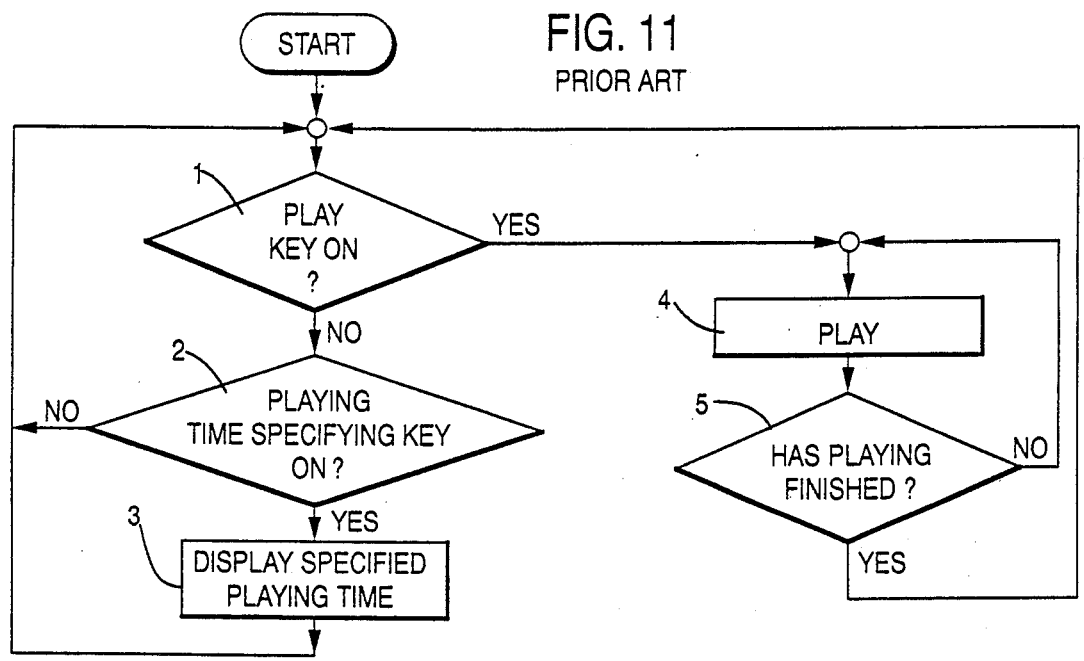
FIG. 11 is the flowchart thereof.
Figure 12:
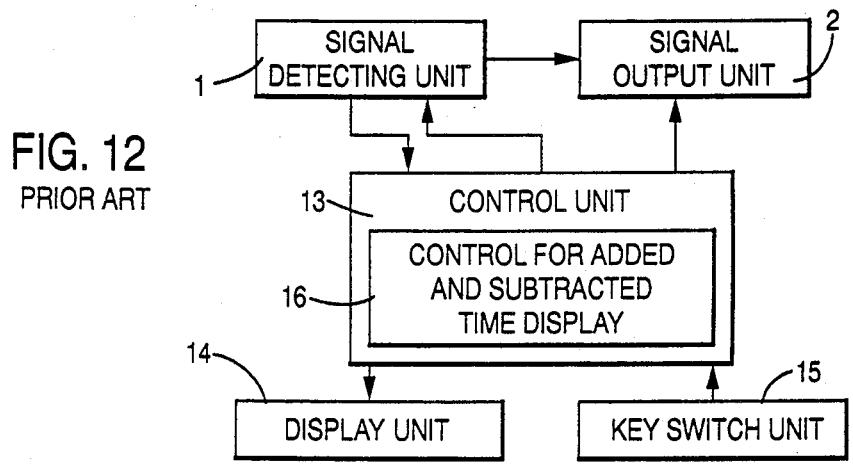
FIG. 12 is the block diagram of the conventional embodiment.
Figure 13:
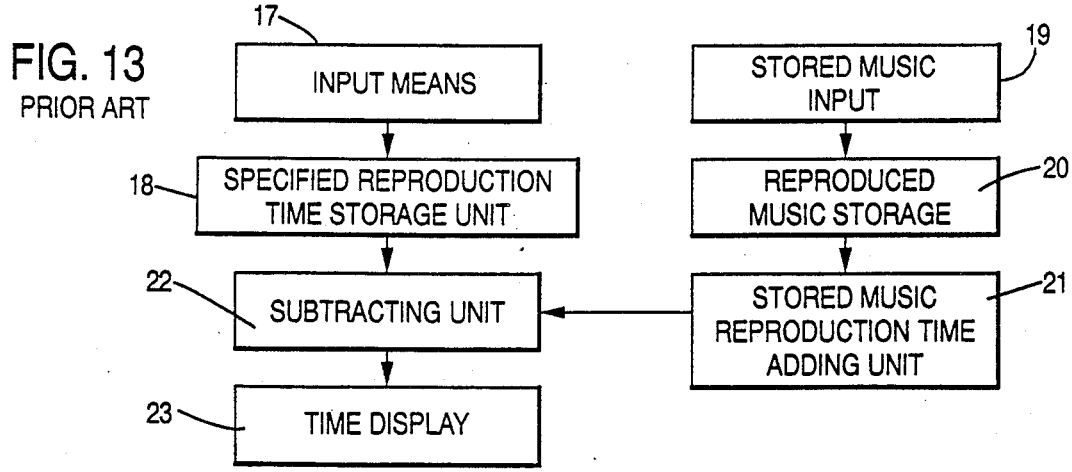
FIG. 13 is the block diagram showing essential parts thereof.
Figure 14:
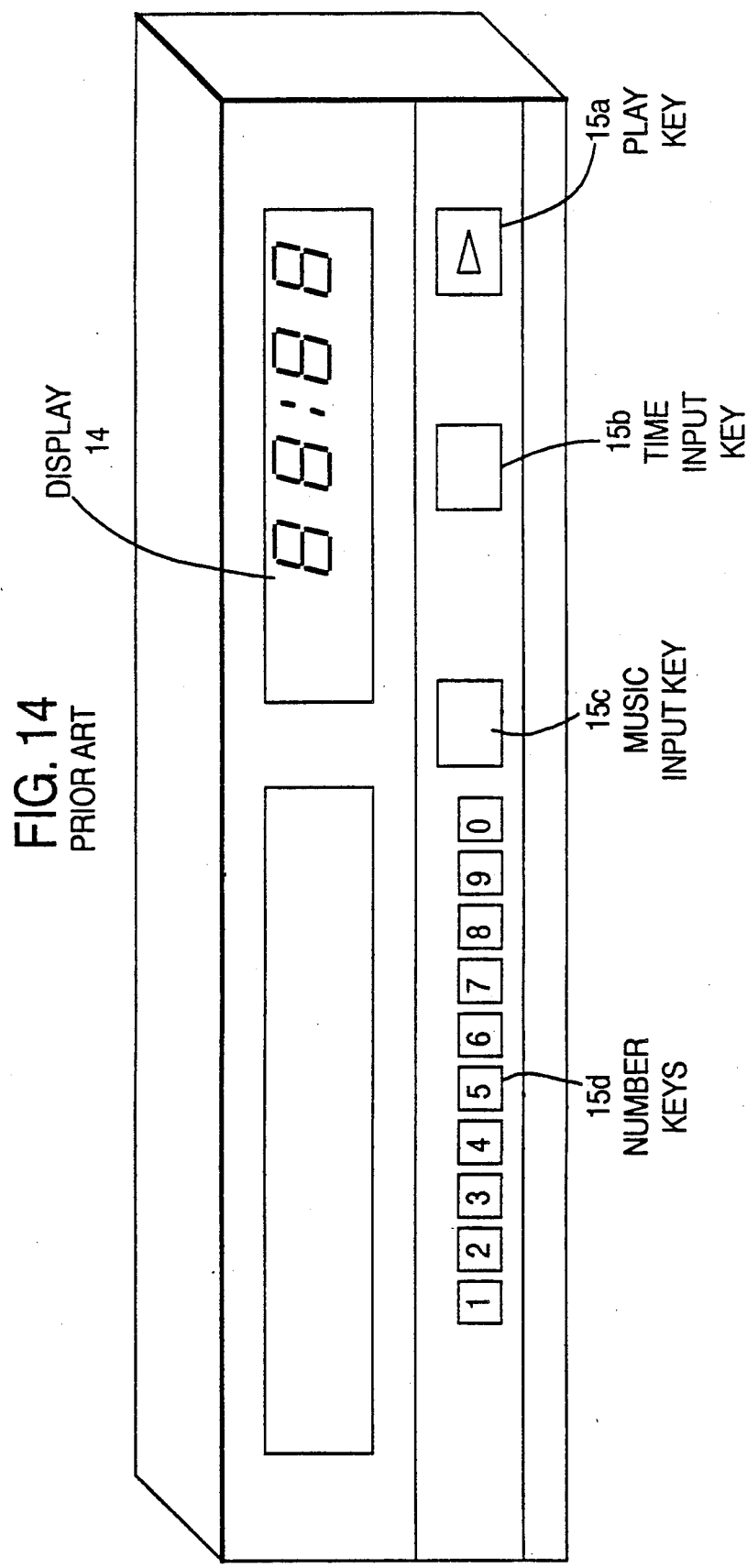
FIG. 14 is the perspective diagram of the appearance of the conventional apparatus.

What is claimed is:

1. A time display device for an apparatus for playing audio information recorded on an optical disk, said time display device comprising:
a playing time input means for specifying a total playing time of the apparatus;
a time storage means for storing said total playing time specified by said playing time input means;
a playing portion input means for specifying portions of the disk which are to be played by the apparatus;
a disk portions storage unit for storing said portions of the disk specified by said playing portion input means;
a time adding means for obtaining a sum of playing times of said portions of the disk specified by said playing portion input means;
a subtracting means for subtracting said sum of playing times of said portions of the disk specified by said playing portion input means from said total playing time specified by said playing time input means to thereby obtain a subtracted value;
a time display means for numerically displaying said subtracted value;
a time scale display means for converting said sum of playing times of said portions of the disk specified by said playing portion input means into time scale display data, and for displaying said sum of playing times in a time scale manner in accordance with said time scale display data; and,
a means for repetitively turning on and off a portion of said time scale displayed by said time scale display means when said subtracted value is a negative value, wherein a length of said portion of said time scale is determined in accordance with an absolute value of said subtracted value.

* * * * *